INVENTOR
BERTIL H. I. CHRISTENSSON
By Jacobs & Jacobs

Feb. 25, 1969 B. H. I. CHRISTENSSON 3,430,233

APPARATUS FOR DETECTING THE PRESENCE AND LOCATION OF GROUND ACOUSTIC INFORMATION FROM AN AIRCRAFT

Filed July 6, 1967

INVENTOR

BERTIL H. I. CHRISTENSSON

By Jacobs & Jacobs

United States Patent Office 3,430,233 Patented Feb. 25, 1969

3,430,233

APPARATUS FOR DETECTING THE PRESENCE AND LOCATION OF GROUND ACOUSTIC INFORMATION FROM AN AIRCRAFT

Bertil Henry Ingemar Christensson, Vasterbogatan 3A Hassleholm, Sweden

Filed July 6, 1967, Ser. No. 651,491
Claims priority, application Sweden, July 8, 1966, 9,351/66
U.S. Cl. 343—6 7 Claims
Int. Cl. G01s *9/66*

ABSTRACT OF THE DISCLOSURE

This invention detects both the presence and location of any source of acoustic information close to the ground from a hovering aircraft. An assembly comprising a microphone for acoustic detection is variably suspended from the aircraft by a cable and the position of the assembly is determined by either radar, light, or wind vane on the assembly in cooperation with the appropriate receiving equipment on the aircraft.

The present invention generally relates to improved air reconnoitering systems, and more particularly to such a system adapted and devised for detecting and localizing from an airborne reconnoitering station, such as an aircraft, advantageously a helicopter, any source of acoustic information present within the ground area below such station.

To enable hostile troop concentrations, for example, to be localized from an airborne reconnoitering station, which may be either an airplane or a helicopter, it is possible according to conventional practice to perform "manual" reconnaissance or aerial photography methods. Sometimes, however, it may be difficult to detect such troop concentrations if they are well camouflaged or, particularly, if they hide in dense forest, jungle or undergrowth vegetation. In cases where the enemy, for example, is producing heat radiation, for instance from heaters used in tents, or by exhaust gases from motor vehicles, it is possible to make observations by infrared photography techniques. Defoliating trees by the use of chemical agents has also been of assistance in making observations according to such methods.

On the other hand, there are many instances where the conventional methods referred to cannot be employed, or would not give a satisfactory result.

The present invention has for its object to provide a novel air reconnoitering system of the kind referred to in the opening paragraph which eliminates the drawbacks and deficiencies of the previous conventional reconnoitering systems by enabling a satisfactory detection and localization of objects present on the ground, provided they are susceptible of producing perceivable energy in any form, preferably acoustic energy, but also, according to more developed embodiments of the invention, optical, heat or electrical energy which may serve as information to be picked up by transducer means suspended from an airborne reconnoitering station.

Further objects and advantages of the invention will appear from the following description of a few embodiments thereof, by way of example only, reference being had to the accompanying somewhat diagrammatic drawings, in which.

Figure 1:
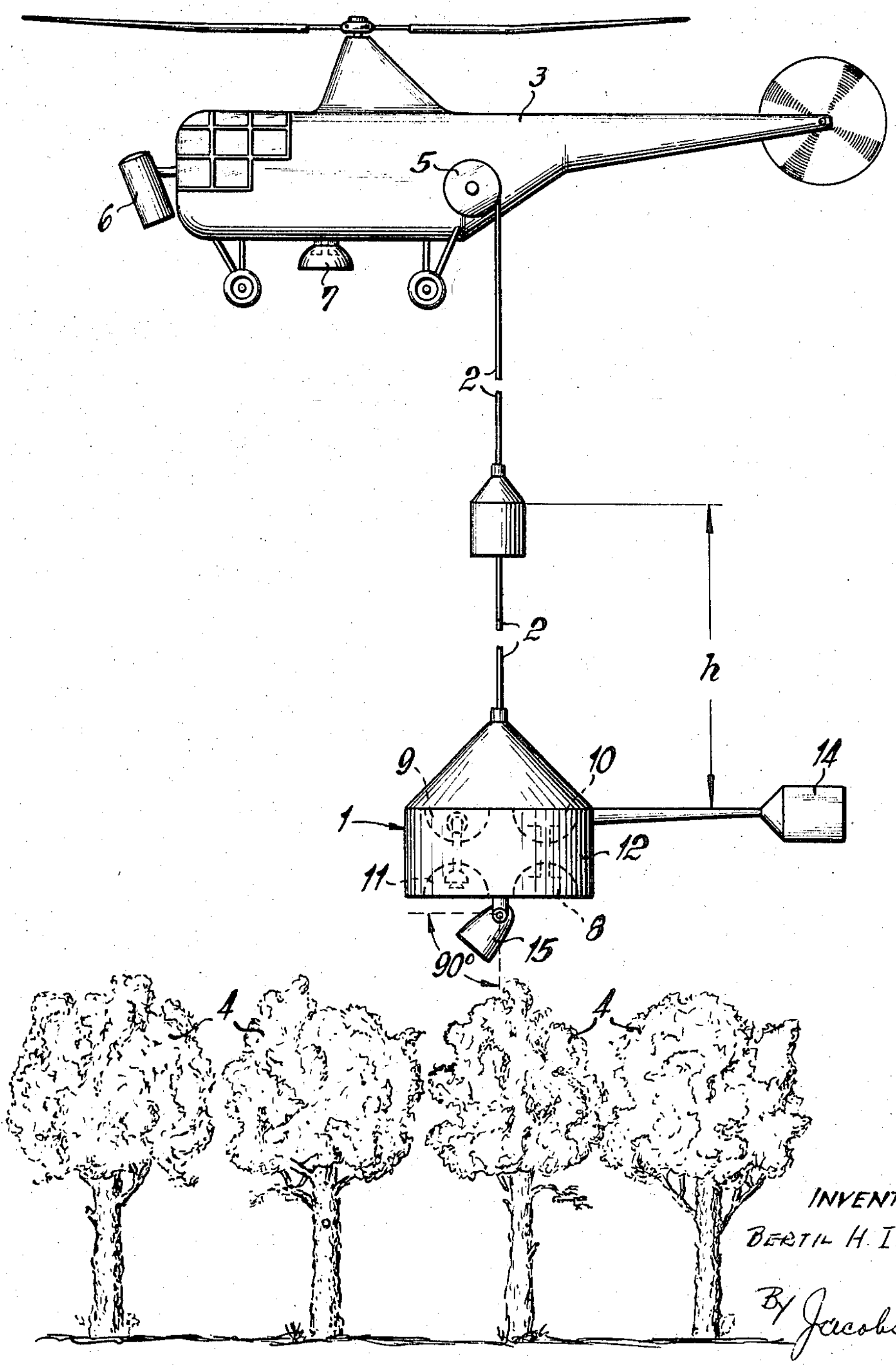
FIGURE 1 illustrates a preferred embodiment of the reconnoitering system in side elevational view with parts of the suspension cable broken away to shorten the height of the illustration, the system being shown in operation above a land area covered with forest vegetation.

Referring first to FIGURE 1 of the drawings, the basic principles underlying the present invention are those of listening to sounds by the aid of a sensitive microphone or transducer unit 1 suspended on a cable 2 from an airborne reconnoitering station in the form, for instance, of a helicopter, airplane or any suitable other aircraft. It would be preferable, however, to use a helicopter, as shown.

The helicopter is flown at sufficient altitude so that the boom of its engine probably cannot be heard from ground. From the helicopter, the cable or wire 2 is hanging down to near the surface or slightly above the tops of the trees 4, if the ground is covered with forest or jungle vegetation, and suspended on the lower end of the flexible cable or wire is the sensitive microphone or transducer unit 1, the microphone being preferably a directional one.

The electrical signals representing the sound information picked up by the microphone are transferred up to the helicopter reconnoitering station after having been amplified by microphone amplifier directly associated with the microphone, the transfer from such amplifier being through electric conductor means associated with the cable 2, and after having been further amplified at the helicopter station, the sounds received by the microphone can be listened to by the observer.

If enemy troops are hiding in a forest, dense undergrowth or jungle vegetation, it is thus possible by such acoustic observation or reconnoitering to hear, for example, enemy soldiers talking with each other, or officers directing commands to the troop, or sentinels pacing up and down, or troops marching. Further, it is possible also to apprehend sounds from enemy vehicles on the ground.

If the helicopter is flying at a sufficient altitude, its own engine noise or the humming of its rotor and propellers is not likely to substantially influence the microphone. By suspending the microphone on a wire, the vibrations of the helicopter are prevented from disturbing the microphone, which would otherwise be the case if the microphone were mounted directly on the helicopter. When using a helicopter it is possible also to move at a sufficiently slow rate, or to hover in the air, if disturbing wind noise should be found to influence the microphone when moving too fast.

The cable or wire 2 should be wound up on a reel 5 within the helicopter 3. The reel should be driven by an electric motor so as to enable the microphone assembly 1 to be moved rapidly up and down.

According to more developed embodiments of the invention, the microphone assembly may be supplemented with certain refinements, such as, for example (see also FIGURE 2) a range finder 8 mounted on the carrier of the microphone assembly 1 and serving to measure the height of the microphone assembly above ground level, or above the level of the tree tops of a forest 4. Such range finder equipment could operate according to radar principles or supersonically according to the echo altimeter principle, as employed on ships, for example. This range finder or altimeter equipment need not operate continuously, but may be switched on and off from the helicopter whenever desired.

When the helicopter is moving ahead, then, because of the slip stream, wind force and wind direction, the microphone unit will not hang straightly down below the helicopter, but will take up a position more or less behind the same and displaced to either side thereof. To determine the actual position of the microphone unit in such instances, several methods may be adopted.

For example, when undertaking the reconnassiance at night or dusk, it is possible to associate with the microphone unit 1 a source of light 9 directed upward towards the helicopter and invisible from ground. Such light source may be lit whenever desired by operating the same from the helicopter. The light source may be an infrared searchlight necessitating the use of special spectacles or indicators to detect the light. Further, the microphone unit may be painted on its upwardly facing surface in a suitable color contrasting against the underlying nature, so that it is readily observable from above with the naked eye or by using a binocular. Its underside and lateral surfaces should have the same color as the sky to prevent its observation from ground.

It is also conceivable to associate the microphone unit with a small radio transmitter 10 adapted to transmit a certain upwardly directed signal, whenever desired, which signal is not apprehensive from ground. In this case, the actual position of the microphone unit 1 could easily be localized by means of a directional receiver aerial (a paraboloidal aerial) 7, FIGURE 1. It could even be possible to arrange for an automatic follow-up of the microphone unit. The radio direction finding method to be described hereinafter may be used in both night and day time.

Now, if a sound is detected which is deemed to originate from small or large concentrations of enemy troops, then any one of various activities may be initiated. Thus, if a possible target has been detected behind the enemy's lines, an order may be given from the helicopter to begin artillery or grenade firing at such target, and fire may be directed from the helicopter.

When flying more or less distantly from the enemy's lines, it would also be possible to dispatch from the helicopter a requisition of fighter planes or bombers from your own side. Further, it is possible to start from the helicopter proper, or from other helicopters accompanying the reconnoitering helicopter, a direct rocket bombardment or machine-gun firing taking aim at or near the light source mounted on the microphone unit. When applying the radio direction finding method instead of a light source, the directional receiving aerial 7 may be employed for controlling the firing of the rockets or machine guns. In FIGURE 1, numeral 6 designates a controllable rocket frame mounted on the helicopter and loaded with a set of rockets.

If, for example, sounds are being listened in from the microphones 11 (FIGURE 2), or a small or large troop concentration is suspected to hide on a particular place beneath the position of the helicopter, it is possible to fire a rocket, or several rockets in rapid sequence, over the actual area. If this area is then listened in again, sounds may be detected originating from enemy soldiers running to take shelter, from officers commanding the men to take shelter, or from talking soldiers. The fire may then be continued.

The helicopter, to advantage, could be flown at an altitude of about 6,500 to 10,000 feet, since the helicopter will then escape any fire from small fire-arms, anti-aircraft machine-guns and light anti-aircraft guns.

The casing 12 (FIGURE 1) of the transducer unit 1 contains the electrical equipment necessary, such as batteries, amplifiers, control equipment etc. The cable 2 of FIGURES 1 and 2 may be a mechanically carrying suspension wire assembled with electrical cables or conducters, as necessary, but is preferably constituted by a combined mechanically carrying and electrically conductive cable assembly.

Such combined suspension and electrically conductive cable would consist of an outer layer of steel wire which has a sufficient tensile strength for carrying the entire suspended assembly and also affords mechanical protection. Inside this outer metallic layer there is a moisture impervious layer, and inside the latter an electrically insulating layer. Enclosed within the latter layer are the various electric cables, each such cable being insulated individually. These cables serve to transfer the microphone currents to the helicopter station, and possibly to supply the microphone or transducer unit with current from the helicopter and for remotely controlling this unit from the helicopter station.

When using one single directly suspended microphone, it may be difficult to localize accurately the directions of incoming sounds. In other words, one cannot obtain any apprehension of the direction from the microphone to the source of sound energy.

Figure 2:
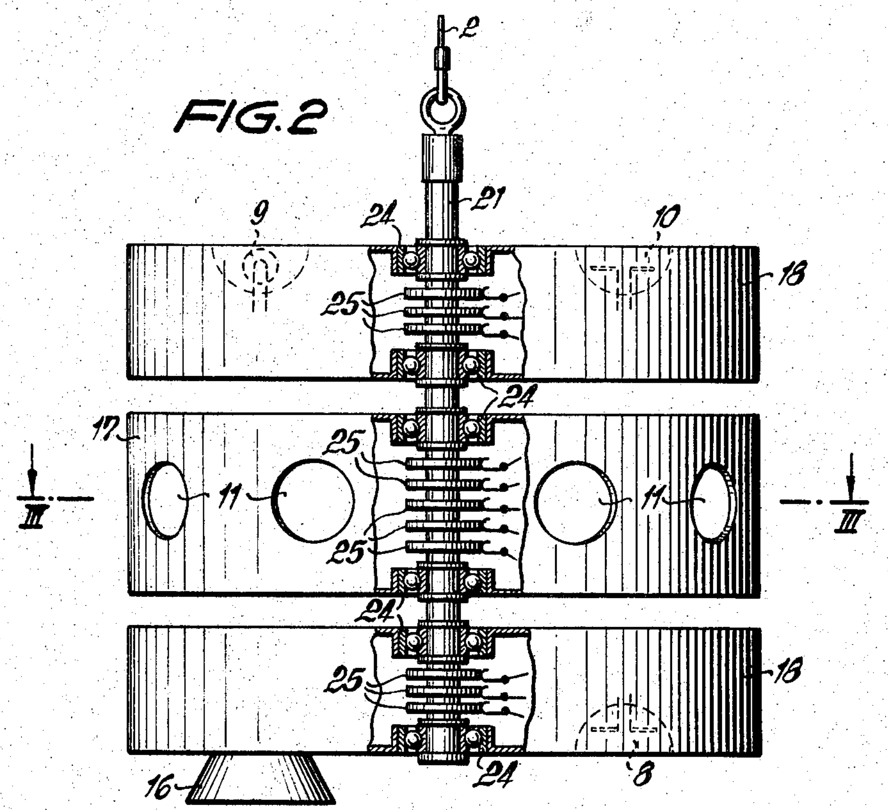
FIGURE 2 is a side elevational view, partly broken away and partly in section, and illustrating a microphone or transducer assembly which, to advantage, may be used in the system illustrated in FIGURE 1.
Figure 3:
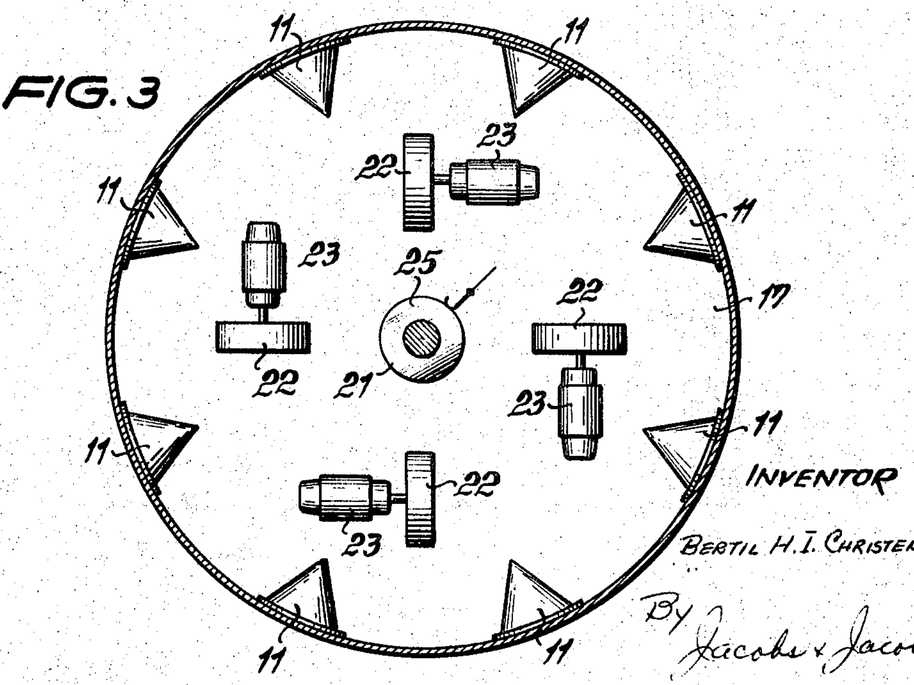
FIGURE 3 is a bottom-plan view of a modified form of microphone or transducer assembly according to a more developed embodiment of the invention.

In order to determine such direction, it is possible to use either one single rotatable microphone 15, FIGURE 1, which may be controlled through a servo system from the helicopter, or a microphone system comprising a plurality a microphones 11, FIGURES 2 and 3, disposed in a circular row, i.e. a system somewhat similar to that employed aboard submarines. One advantage gained by the employment of a multi-microphone system of this type resides in that the acoustic reconnoitering system will always be susceptible to sound energy from all directions, and in that changes in listening direction will take place without any mechanical inertia.

The first-mentioned system with one single rotatable microphone, i.e. that of FIGURE 1, may be difficult to realize practically because of the difficulty of stabilising the casing within which the rotatable microphone 15, FIGURE 1, is mounted since this casing is suspended on a wire or cable. However, it might be stabilized by the use of a tail stabilizing fin or wind vane 14, FIGURE 1.

The microphone could also be angularly adjustable in a vertical plane through 90 degrees so as to enable listening in sounds from sources situated beneath the microphone.

As the helicopter is being flown ahead, the stabilizer fin or wind vane 14 will orient itself substantially rearwardly, and the casing will take up a more or less stabilized direction of orientation. When the helicopter is hovering, the wind, if its velocity is sufficient, will act on the stabilizer vane so as to orient the same in a definitive direction. By the aid of a gyro compass and a servo system built into the casing, it is possible to get an apprehension aboard the helicopter as to the instantaneous orientation of the microphone in an azimuth.

When using the second-mentioned system, i.e. the multimicrophone system shown in FIGURES 2 and 3, it is readily possible to determine the direction of incoming sound energy. To stabilize this system, a tail vane may be used, as previously described in connection with the first-mentioned system. The system is further provided with a gyro compass and a servo system to get an apprehension aboard the helicopter as to the instantaneous orientation of the microphone system in azimuth.

It would be possible to devise this last-mentioned system all automatic in operation, so as to cause the deviation or error to the action of the wind to correct automatically the corresponding directional deviation within the indicating system aboard the helicopter. The arrangement could also be provided with an additional microphone 16 oriented vertically, as shown in FIGURE 2, and serving for scanning the ground area directly beneath the microphone or transducer unit.

The arrangement of FIGURES 2 and 3 has the advantage over that of FIGURE 1 in that the former has circumferentially fixed microphones 11. This will avoid the disadvantage of the system of FIGURE 1 which resides in that the casing will be subjected to a rotational disturbance whenever the microphone is rotated.

The vertically oriented microphone 16 enables the determination of the passage directly above a source of sound energy. This microphone system, too, should be provided or supplemented, of course, with one or more of the auxiliary equipments mentioned hereinbefore, i.e. an instrument 8 for measuring the height or altitude of the microphone assembly 17, a light source 9 or a radio transmitter 10. Thus, if a source of sound energy is being detected with this system, it is possible by means of this arrangement to determine the direction of said source of sound energy and to fly directly towards this source. If, in the meantime, the position of the source of sound energy is changed, it is possible to correct the course of the helicopter correspondingly. When arriving directly above the source of sound energy, this fact can be established through the vertically oriented microphone 16, FIGURE 2.

A further solution to the problem is also illustrated in FIGURE 2. In this arrangement, the circular row of microphones 11 is mounted on a carrier ring 17 which is freely journalled by ball bearings 24 about a vertical shaft 21. The microphone assembly 11, 17 is maintained stabilized in a predetermined direction of orientation by means of gyroscopic rotors 22 mounted within the microphone carrier ring 17 and adapted to be rotated at constant speed by electric motors 23, respectively. The microphone connections, as well as the current-supply connections, are effected through brush and slip-ring arrangements 25. The remaining equipment 18 is secured to the vertical shaft 21. To avoid torsional oscillations of the assembly suspended on the long wire or cable, it is possible to stabilize the assembly by means of a tail vane, similar to vane 14 of FIGURE 1.

A still further solution to the problem is illustrated in FIGURE 3. In this case, the microphone carrier ring 17 is journalled on shaft 21 and provided with stabilising gyroscopic rotors 22, driven by electric motors 23, exactly as illustrated in FIGURE 2, but the further equipment 18 is also journalled on this vertical shaft 21 which is fastened to the wire or cable 2. All the components of both 17 and 18 are supplied by current through brush and slip-ring connections 25. This arrangement will afford the advantage that there will be no substantial mass of inertia to carry out torsional oscillations together with the wire or cable 2. The parts 18 need not necessarily be provided with stabilizing gyro rotors. They could possibly be provided each with stabilizing tail vanes.

If it is desired to determine the distance of a source of sound energy, such as a gun being fired, it is possible to use an arrangement indicated in FIGURE 1. It comprises a first microphone or transducer unit 1 suspended from the lowermost end of the wire or cable 2, and a similar second microphone or transducer unit 19 disposed at the height $h$ above unit 1. Now, when a gun is fired on the ground, the acoustic waves will be received both by microphone 1 and by microphone 19, and there will be a definite time difference between the two receptions of the acoustic waves. This time difference being thus known, anl also the height $h$, it is possible to determine the distance to the position of the gun which was fired.

The systems thus described, in addition, may be used by police forces to localize criminals hiding in forest areas and the like.

Further, if supplemented with a loudspeaker, the system of the invention may be employed to trace out people hidden in a forest, for instance airmen which have jumped down into the forest with parachutes, or children which have gotten lost in a forest. The system may be used to trace out people both in forest vegetation and on flat ground, at sea or in the mountains, if the visibility is bad due to darkness, fog or snow storm.

It is understood, however, that the invention is susceptible of many variations and modifications without departing from its scope, and falling within the scope of the appended claims. Thus, for instance, the system may be supplemented with signalling, camera, television camera, infrared camera and similar esuipment, as desired.

What I claim is:

1. An air reconnoitering system for detecting and localizing from an airborne reconnoitering station any source of acoustic information present within the ground area therebelow; comprising microphone means remotely and variably suspendable from said airborne station to scan said ground area at low altitude thereabove and to convert any acoustic information picked up therefrom into electrical signals, means for transferring such information signals to said airborne station, means at said station for receiving and recognizing said information signals, altitude measuring means disposed at said microphone means for measuring the height of the microphone means above the ground topography and for communicating its measure information to said airborne station, and position signalling means disposed at said microphone means and adapted or controllable to signal its position to said airborne station, thereby enabling localization of any source of acoustic information from which such information is being received at said airborne station.

2. An air reconnoitering system according to claim 1 characterized in that said altitude measuring means comprises radar transmitting means associated with said microphone means, and a radar signal receiving and evaluating means disposed at said airborne station.

3. An air reconnoitering system according to claim 1 characterized in that said position signalling means comprises a light source adapted to continuously or controllably to direct a beam of light upward towards said airborne reconnoitering station.

4. An air reconnoitering system according to claim 1 characterized in that said position signalling means comprises a directional radio transmitter associated with said microphone means and adapted to transmit directional radio signals towards said airborne station, and directional receiving means including a direction finder aerial disposed at said station to receive and evaluate said radio signals to indicate the direction of said microphone means from said station.

5. An air reconnoitering system for detecting and localizing from an airborne reconnoitering station any source of acoustic information present within the ground area therebelow; comprising a microphone assembly includig a plurality of microphones disposed in a substantially horizontally oriented circular row to enable determination of the receipt direction of any acoustic information received by said microphone assembly, said microphone assembly being remotely and variable suspensible from said airborne station to scan said ground area at low altitude thereabove and to convert any acoustic information picked up therefrom into electrical signals, means for transferring such information signals through electric cable transferring means to said station, means at said station for receiving and recognizing said signals, altitude measuring means associated with said microphone assembly for measuring the height of said assembly above the ground topography and for communicating its measurements to said station, and position signalling means associated with said microphone assembly and adapted to signal its position to said station, thereby enabling accurate localization of any source of acoustic information relative to said microphone assembly as well as relative to said airborne station.

6. An air reconnoitering system for detecting and localizing from an airborne reconnoitering station any source of acoustic information present within the ground area therebelow; comprising a microphone assembly including a plurality of microphones disposed in a substantially horizontally oriented circular row, flexible cable means for variably suspending said microphone assembly from said station to scan said area at low altitude and to convert any acoustic information energy received thereby into electrical signals, electrical conductor means associated with said suspension cable means for transferring electric currents between said assembly and said station, means at said station for receiving and evaluating said signals, altitude measuring means associated with said microphone assembly for measuring the altitude of said assembly above the topography of said ground areas and for communicating its measurements to said station, electrically operated position signalling gyroscopic means associated with said microphone assembly and adapted to stabilize the orientation of the assembly and to signal its position to said station, electrically conductive shaft means for freely journalling said microphone assembly being fixedly suspended from the lower end of said flexible suspension cable means, and brush and slip-ring means associated with said gyroscopic means and said shaft means, respectively, for passing electrical operating currents and signal currents in the proper directions between said microphones and gyroscopic means, on one hand, and said airborne station, on the other hand, so as to enable accurate determination of the direction and position of any source of acoustic information relative to said airborne station.

7. An air reconnoitering system for detecting and localizing from an airborne reconnoitering station any source of acoustic information present within the ground area therebelow; comprising first microphone means remotely and variably suspensible on the lower end of a flexible combined electrical and suspension cable having its upper end fixed to a reel mounted at said airborne station to scan the ground area at low altitude thereabove and to convert any acoustic information picked up therefrom into electrical signals, said signals being transferred through said cable to receiving and detecting means comprised in said airborne station electrical altitude measuring means associated with said first microphone means for measuring the height of said microphone above the ground topography and for transmitting its measure information in the form of electrical signals through said cable to said airborne station, position signalling means associated with said first microphone means and adapted to signal its position electrically to said airborne station through said cable, thereby enabling directional localization of any source of acoustic information, and second microphone means suspended at a certain distance above said first microphone means, said second microphone means being similarly connected to transmit its signals to said airborne station, thereby enabling the distance of the source of acoustic information from said first and second microphone means to be determined at said airborne station.

References Cited

UNITED STATES PATENTS

| | | | |
|---|---|---|---|
| 1,977,198 | 10/1934 | Nicolson | 181—26 X |
| 3,030,050 | 4/1962 | Hagemann. | |
| 3,141,960 | 7/1964 | Biser. | |
| 3,159,806 | 12/1964 | Piasecki | 340—3 |

RODNEY D. BENNETT, *Primary Examiner.*

M. F. HUFLER, *Assistant Examiner.*

U.S. Cl. X.R.

181—5, 26; 340—16